United States Patent [19]
Rohrbaugh

[11] Patent Number: 5,423,654
[45] Date of Patent: Jun. 13, 1995

[54] MINIATURE, PORTABLE, SELF-CONTAINED POWER MACHINE

[76] Inventor: David J. Rohrbaugh, Box 3555, Oakland, Md. 21550

[21] Appl. No.: 951,016

[22] Filed: Sep. 25, 1992

[51] Int. Cl.⁶ .............................................. E02F 3/00
[52] U.S. Cl. .................................... 414/686; 414/687; 414/718; 414/918; 298/1 A; 180/211; 180/306
[58] Field of Search .............. 180/305, 306, 2.1, 95.2, 180/6.28, 6.3, 6.7, 9.1, 68.5; 198/813, 500; 414/686, 687, 718, 728, 918; 298/22 R, 1 A

[56] References Cited

U.S. PATENT DOCUMENTS

| | | | |
|---|---|---|---|
| 2,984,373 | 5/1961 | Przybylski | 414/687 X |
| 3,412,819 | 11/1968 | Kruckman | 180/2.1 |
| 3,540,220 | 11/1970 | Lauck | 180/6.7 X |
| 3,833,261 | 9/1974 | Dingles | 298/22 R X |
| 4,547,119 | 10/1985 | Chance et al. | 414/718 X |
| 4,676,713 | 6/1987 | Voelpel | 414/590 |
| 4,691,806 | 9/1987 | Jansen et al. | 414/918 X |
| 5,027,940 | 7/1991 | Woodward | 198/500 |
| 5,040,428 | 8/1991 | Miyaoka et al. | 414/687 X |
| 5,083,895 | 1/1992 | McBirnie | 414/728 X |

Primary Examiner—Donald W. Underwood
Attorney, Agent, or Firm—Walter G. Finch

[57] ABSTRACT

Disclosed herein is a miniature, portable, self-contained power machine for handling materials, comprising, a rigid frame providing the base structure for all components of said machine, a means of electrical power supply for said machine, means for regulating the motion of said machine, two endless belts forming a belt traction system and serving as the means to move said machine over various types of terrain, means for readily receiving and rigidly securing a variety of miniature, hydraulically powered material handling implements to said machine, and a central hydraulic system which is powered by said power supply means and which supplies power to said attachable material handling implements. The machine has a diversity of applications in numerous industries. The machine accepts any of a variety of attachable implements through an assembly socket and a torque arm socket, and then links the implement to the central hydraulic system with hydraulic hoses leading to a hydraulic power manifold. Two of these implements include a telescoping boom and bucket assembly and an improved forward reach and higher lift capacity bucket assembly. A hydraulically powered dumping bed attachment may be bolted to the rigid frame of the machine and further modified to result in a hydraulically powered dumping bed and hopper attachment.

6 Claims, 11 Drawing Sheets

MINIATURE, PORTABLE, SELF-CONTAINED POWER MACHINE

BACKGROUND OF THE INVENTION

This invention relates to equipment for handling materials, and more particularly, to a miniature, portable, self-contained power machine for use in the coal mining industry as well as other in other industries.

Throughout history, the mining and construction industries have both attempted to maximize the individual productivity of a worker. As time went on and technology advanced, machines which could give a single operator more power and capability to perform various tasks were developed and implemented into both industries. These machines, having typically been powered either electrically or hydraulically, gave the operators increasingly more and more ability to accomplish that which was once only achievable through strenuous manual labor.

In general, it may be said that the mining and construction industries have chosen the path of bigger, more powerful equipment. The prevailing philosophy seems to be that the more powerful the capital that a single worker has to operate, the more productively efficient that worker can function. In other words, by having larger and more powerful machines, an industry can accomplish the at least the same amount of work that it could if it had more workers and smaller, less powerful machines. The advantage of committing to bigger, more expensive machinery rests in the fact that, by spreading out the high fixed costs of these larger machines over thousands of hours of operation, an industry will ultimately save money by having less labor costs.

This commitment to bigger equipment has served the coal mining industry well. In mining, large equipment, personnel, electric power systems, and conveyor systems are all located in confined tunnels measuring from four feet to ten feet high by sixteen feet to twenty feet wide. These tunnels are progressively extended further into the ground as the recovery process continues. In addition to these tunnels, fresh air corridors have to be developed to circulate air from the surface, to the working areas of the mine, and back again to the surface. This is accomplished by building solid block walls in cross tunnels to keep each tunnel entry isolated.

As a mine advances forward, some back entries become impossible to reach with current larger mining machinery. These entries become partially obstructed with new rail systems, new conveyors, and a number of other obstacles. Yet, these areas often require different maintenance routines such as providing additional roof support, cleaning conveyor entries, shoveling and hauling out loose material, and building new stopping walls that have been damaged. Unfortunately, the tight clearance of approximately four feet afforded to many of these entries leaves virtually no alternative but to do whatever task there is manually. Though the bigger, more powerful machines could easily do the jobs, they simply cannot fit. Instead, men with shovels, wheelbarrows, and other manual tools are forced to do whatever task there may be within these confined entries with nothing except shear manpower. Materials such as concrete, concrete blocks, wood support posts, metal roofbolts, air drills, and rock dust are thus carried by hand to these hard to access, narrow areas.

The mining industry therefore lacks a power machine that is small enough to fit through the four feet of minimum width clearance in a conveyor belt entry, that is versatile to the degree that it is able to accomplish a large variety of functions with different hydraulically powered implements, that is able to pass over the roughest types of terrain, and that receives power from a supply attached to the machine or from a supply external to the machine.

BEST KNOWN PRIOR ART

Industry's commitment to bigger and more powerful machinery has resulted in massive machines which can let a single man accomplish a tremendous amount of work. The Hitachi EX1100, an example of a massive and powerful machine, may be used as a front end loader or as a back hoe. A machine of this nature, boasting a 580 horsepower engine and hydraulically powered implements, has numerous applications in the both the mining and construction industries.

Another type of machine, often termed the "Scoop", is more specific to the mining industry. The Simmons Rand 488X90 is one particular model of "Scoop" which assists in mining operations. Such a machine is approximately ten feet wide, sixteen feet long, and four feet tall. These machines are generally able to maneuver around the tunnels of a mine, readily scooping up and hauling away loose materials. Their low heights allow them to operate in passageways with low ceilings. Used in conjunction with continuous miners, the machines that actually rip into the ground, these "Scoop" machines give a single individual an immense amount of working capability.

Yet, while both these types of "Scoop" and back hoe machines as well as many other large scale power machines add enormously to the working productivity of an individual, they only do so in areas where they fit. Both the Hitachi EX1100 and the Simmons Rand 488X90 are excellent for tasks in open areas or wide corridors, but neither is of any worth when the job at hand rests in a narrow passageway such as those often encountered in the mining industry when the mine advances forward.

Some progress has been made in the area of creating miniature power machines that will assist in these tight passageways. HD Engineering of Hong Kong has introduced the HD30-C, a hydraulically powered, miniature drill rig which can drill numerous size holes with different accessories. The HD30-C can be either skid or crawler mounted for above or below ground applications. Even the conventional wheelbarrow has been modified to add to the working productivity of an individual.

Though the HD30-C drill rig and both wheelbarrow devices may help individuals accomplish tasks in narrow passageways, they only do so for very specific jobs. That is, if a worker needed to scoop up and dump an amount of loose material contained in a tight passageway, the HD30-C drill rig would be of no use. Instead, either one or a group of workers would have to revert to shoveling and wheelbarrowing to accomplish the job. Additionally, if a worker needed to haul a large amount of cement blocks into a narrow corridor, the Hoover, et al. wheelbarrow would be of very limited use.

Therefore, the art is lacking a miniature power machine which could be readily fitted with a variety of hydraulically powered implements to help a single individual perform a diversity of tasks in narrow working areas. Although such a device would not be able to compete with larger, more powerful machines, it would greatly enhance the working productivity of an individual in confined areas where the larger machines cannot reach.

SUMMARY OF THE INVENTION

In order to provide an individual with both a diversified and an increased working capability in confined passageways, the present invention teaches a miniature, portable, self-contained power machine that can be operated by a single person. The machine can be readily fitted with any of a variety of miniature, hydraulically powered implements to meet the needs of whatever job may be at hand.

Running at approximately five horsepower, the machine is all hydraulic. Its drive train and implements are all hydraulically powered via a central hydraulic system built into the machine. The hydraulic system is powered by a portable battery supply contained on the machine itself. Being joined to the machine with hold down bolts and quick connect plugs, the battery supply can be quickly replaced with a new battery supply when needed. Though the machine runs on a portable battery supply, it could readily be powered by an ancillary electric power source when such a power source is available. Additionally, since the machine and its implements are completely hydraulically driven, the machine could be directly coupled to any outside hydraulic system with two hydraulic hoses and run in that manner. The advantage to coupling the machine to an auxiliary electric or hydraulic power source is, of course, reserving the power contained within the portable battery supply for places where no other power supply is available.

Being approximately thirty six inches wide, the machine has been designed to work within the four feet of minimal width clearance in a conveyor belt entry. The machine is operated by a single individual walking behind the unit since a smaller design usually creates an instability factor. In other words, by having a smaller base, the miniature machine would be more likely to tip over than would a larger scale machine. Thus, in order to avoid injury, the operator stands behind the machine rather than sits on the machine. In order to provide maximum stability in a miniature design, the machine is based on a traction system formed from two endless rubber belts. The outer surfaces of the belts are supplied with metal cleats joined to traction bars on their inner surfaces. A sprocket mechanism engages the traction bars and forces the belts to each rotate around its respective track. This belt traction design is superior to rubber wheel designs in that it offers superior stability and improved traction on the most uneven and soft terrains. The belt traction system is driven hydraulically by the central hydraulic system contained within the machine.

The machine has a platform with two openings connected to its main rigid frame which readily receives and rigidly secures any of a variety of hydraulically powered implements. Once secured to the machine, the hydraulically powered implement is hydraulically coupled to the central hydraulic system through hydraulic hoses leading to a central hydraulic power manifold. Two such hydraulically powered implements that readily connect to the platform of the machine are a telescoping boom and bucket assembly and an improved forward reach and higher lift capacity bucket assembly. The telescoping boom and bucket assembly is very useful for shoveling in confined areas. That is, by retracting the load and then rotating, the telescoping boom and bucket assembly permits a load to be rotated without interference with surrounding walls or obstacles. Also, by rotating the load in a retracted position, the boom is less extended and thereby experiences less instability. The improved forward reach and higher lift capacity bucket assembly allows its bucket to reach approximately forty two inches forward at ground level without moving the machine at all. Since only the bucket arm and not the entire machine is being moved forward, less power may be consumed while scooping a load into the bucket. Additionally, the improved forward reach and higher lift capacity bucket assembly allows loads to be lifted and dumped at higher elevations than would otherwise be permitted with traditional bucket assemblies.

One hydraulically powered implement which would not be joined to the openings of the platform of the machine but would be bolted to the frame of the machine itself is a dumping bed attachment. Since the dumping bed may be loaded with tremendous amounts of weight, the machine would respond better if the load were spread out more evenly over its entire frame rather than locally at the platform. The dumping bed attachment, like both of the aforementioned bucket assemblies, is hydraulically linked to the central hydraulic system of the machine. The dumping bed attachment would allow heavy materials such as concrete blocks to be hauled and dumped at any designated location. Adding sideboards and a tail gate to the dumping bed implement would result in a hydraulically powered dumping hopper attachment. Loads of loose material such as coal or dirt could be hauled in this hopper attachment and selectively dumped at any prescribed location.

The platform with two openings connected to the main rigid frame of the machine could receive and securely fasten many other different types of hydraulically powered implements in addition to the two bucket assemblies mentioned. For example, a hydraulic fork attachment would make the machine a hydraulically powered fork lift. A hydraulic rotary drill attachment would make the machine a hydraulically powered roof or rib bolter. A hydraulic winch attachment would make the machine into a hydraulically powered skidder. A hydraulic clamping fork attachment could be added to make the machine into a hydraulically powered timber loader. A hydraulic cutter ring attachment would enable the machine to cut solid coal or pavement. An appropriate bucket attachment could be added to make the machine a hydraulically powered back hoe. A simple blade attachment would transform the machine into a bulldozer.

Control over the motion of the machine and its hydraulically powered implements would be accomplished through designated movements of levers external to the machine on its rear side. There, an operator walking behind the machine would be able to selectively adjust the levers in order to operate the machine in a prescribed fashion. Movement of the machine itself would be accomplished by a single control lever. Forward movement of the machine would necessitate a forward push on the lever. The opposite would hold for reverse movement. Sideways movement would be accomplished by simply turning or twisting the lever toward the desired direction. Control of the hydraulically powered implements would be exercised through two different, individual levers. For example, if a boom and bucket assembly were attached to the machine, one lever would control its bucket tilt and boom extend, while the other lever would control its boom swing and boom lift.

Adjacent to the control levers on the machine is an emergency stop switch or an emergency stop bar. When this switch or bar is pressed, the electric power supply to the machine is interrupted and the hydraulic pressure is automatically relieved. This occurs whether the electric power source is contained on the machine or external to the machine. In the event that the machine is being run by an external hydraulic power source, the emergency stop switch or bar will activate a hydraulic conversion valve to return all incoming hydraulic fluid to the outside source, and thereby release all hydraulic pressure in the machine.

In close proximity to the control levers and the emergency stop switch or bar, there is also an off/on switch, a battery charge indicator, a main hydraulic pressure gauge, and a light switch. These serve to provide the operator of the machine as well as others in close vicinity to the machine with control over and information about the systems of the machine.

OBJECTS OF THE INVENTION

It is an object of this invention to provide a miniature, portable, self-contained power machine for use in confined areas in industry.

Other objects of this invention are to provide a novel, miniature, portable, self-contained power machine which has a central hydraulic system, a belt traction system, and means to readily receive and tightly secure any one of a variety of miniature, hydraulically powered material handling implements.

Still another object of this invention is to provide a miniature, portable, self-contained power machine whereby the belt traction system and the variety of miniature, hydraulically powered material handling implements are powered by the central hydraulic system.

Yet another object of this invention is to provide a novel, miniature power machine that can be powered by a portable battery source contained on the machine, an external electric power source, or an ancillary hydraulic power source.

To provide a unique, miniature power machine wherein several of the variety of miniature, hydraulically powered material handling implements are a telescoping boom and bucket assembly, an improved forward reach and higher lift capacity bucket assembly, and a dumping bed assembly are other objects of this invention.

To provide a miniature, portable, self-contained power machine whereby control over the belt traction system and the hydraulically powered material handling implements is exercised through a series of levers is another object of this invention.

To provide a novel, miniature, portable, self-contained power machine that can be operated by a single person standing behind the machine is still another object of this invention.

To provide a miniature, portable, self-contained power machine that is relatively light in weight, dependable in operational use, and economical to manufacture are still other objects of this invention.

And to provide a unique, miniature power machine that incorporates safety in operational use through a walk-behind design and an emergency stop switch is yet another object of this invention.

BRIEF DESCRIPTION OF THE DRAWINGS

These and other attendant advantages of this invention will become more obvious and apparent from the following detailed specification and accompanying drawings in which.

DESCRIPTION OF THE PREFERRED EMBODIMENTS OF THE INVENTION

Referring now to FIGS. 1 to 11 of the drawings, there is shown the preferred embodiment of a miniature, portable, self-contained power machine 90, whose size and unique features assist a single individual in working in narrow, hard to access areas. The machine 90 is operated by a single individual. For reasons associated with the decrease in stability of a small-scaled device, the operator walks behind the machine 90 rather than sits on it. Since the machine 90 has been designed to be approximately thirty six inches wide, it easily passes through the legal four feet of minimum width clearance in the conveyor belt entry of a mine. The machine is based on a belt traction system, and therefore can pass over the softest and roughest of terrains. Having the machine 90 operate in areas that were previously inaccessible to such a device allows tasks that were once only accomplished manually to be accomplished mechanically. These tasks include digging, shovelling, hauling, and a number of others. Doing these jobs with assistance of the present machine 90 translates into increased worker productivity. The machine 90 has been designed around five horsepower and weighs approximately one thousand pounds.

The lifeblood of the machine 90 is a central hydraulic system. This central hydraulic system not only drives the belt traction system but also powers any of a number of miniature, hydraulically powered implements that may be inflexibly attached to the machine 90. These hydraulically powered implements provide the machine 90 with its wide applicational diversity. Whether it be digging, hauling, or dumping, each one of the different implements has its own specific function.

Figure 1:
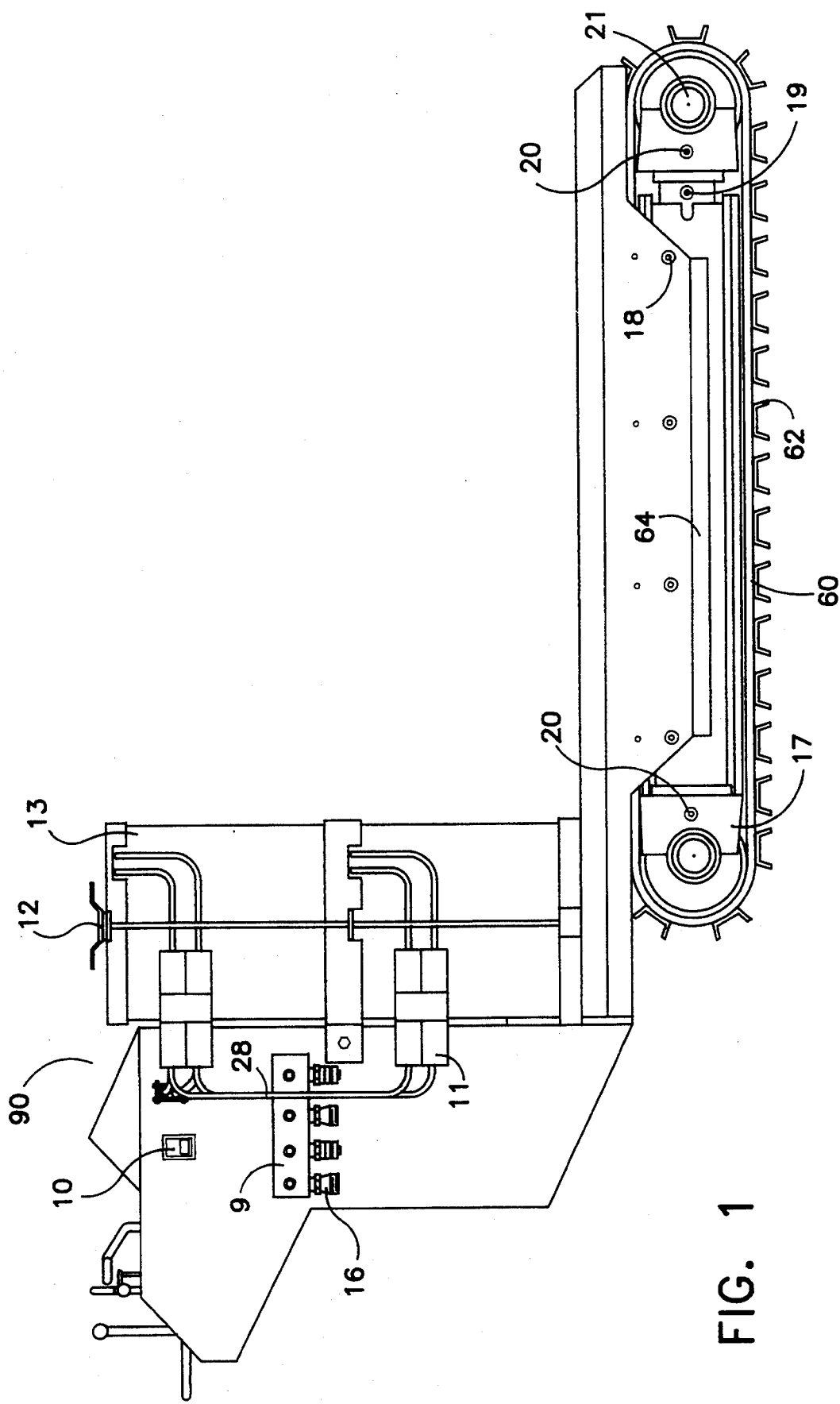
FIG. 1 is a left side view of a miniature, portable, self-contained power machine incorporating novel features of this invention.

FIG. 1 illustrates a left side view of the machine 90 by itself. The machine rest on supporting members 64 which are inflexibly joined to a belt traction system. The machine 90 is secured to the belt traction system by track frame mounting bolts 18. The belt traction system is formed from two endless belts 60 which rotate around a track. The belts 60 have metal cleats 62 fixed to their outer surfaces in order to gain superior traction on virtually any type of terrain. These metal cleats 62 are bolted to traction bars on the inner surface of the belts 60. The traction bars are coupled with rotating sprocket mechanisms, and the belts 60 are subsequently rotated about their respective tracks. The final drive end assembly 17 is the powered end of the belt traction system. On the other end of the belt traction system is the front idler/take-up assembly 21 which provides the means for track tensioning adjustment. Proper track tensioning is achieved by injecting grease in the track take-up grease fitting 19. Lubrication of the Cat traction bearings is accomplished by injecting grease in the bearing grease fittings 20. Since the machine is associated with heavy weights and not high rpm's, the bearings of the belt traction system will be spherical balls.

Figure 5:
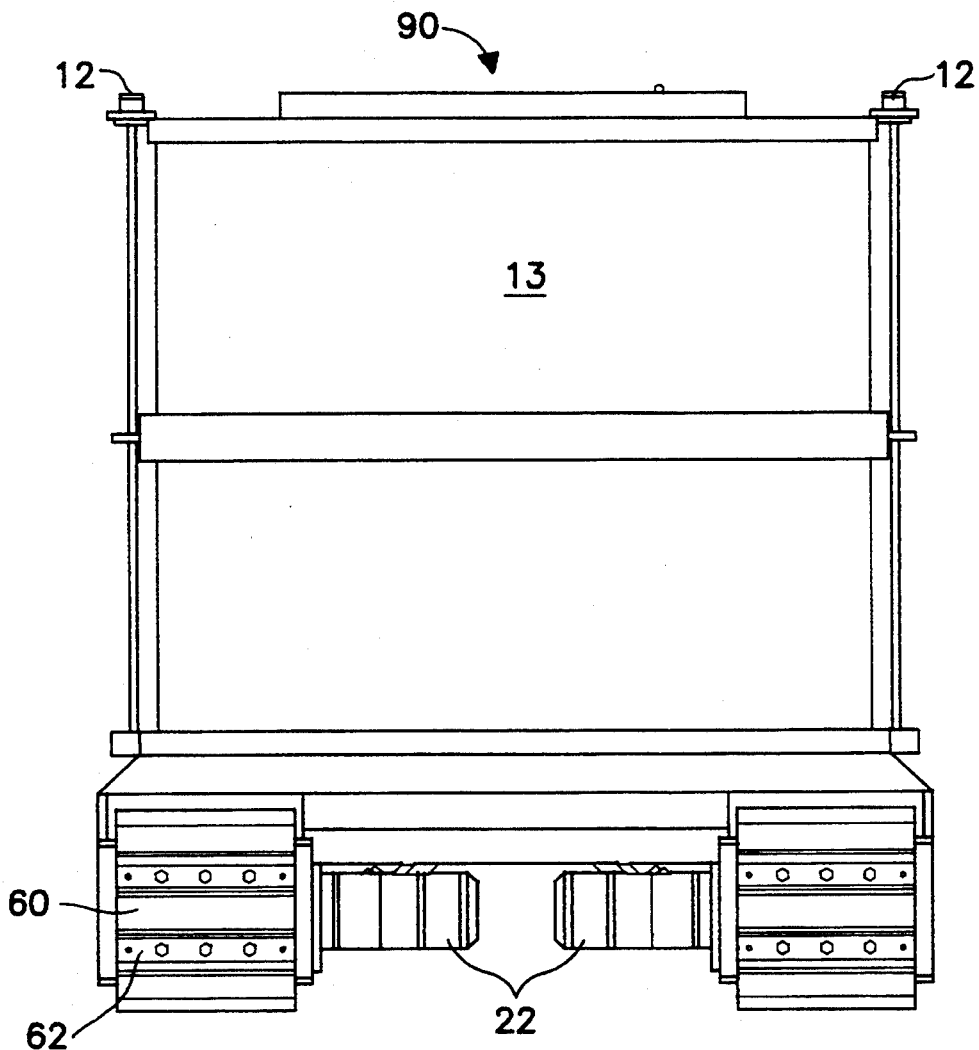
FIG. 5 is a front view of the power machine of FIG. 1.

The belt traction system is driven by the central hydraulic system of the machine 90. FIG. 5 illustrates the last stage of hydraulic power transfer from the central hydraulic system to the belt traction system. Hydraulic power from the central hydraulic system reaches the belt traction system through two hydraulic motors 22 which are directly coupled into the drive shafts of the belt traction system. Not only are the hydraulic motors 22 extremely efficient in operational use but they alone are also sufficient to meet the torque requirements of the machine 90. This eliminates the need for any additional gearing arrangement.

Figure 6:
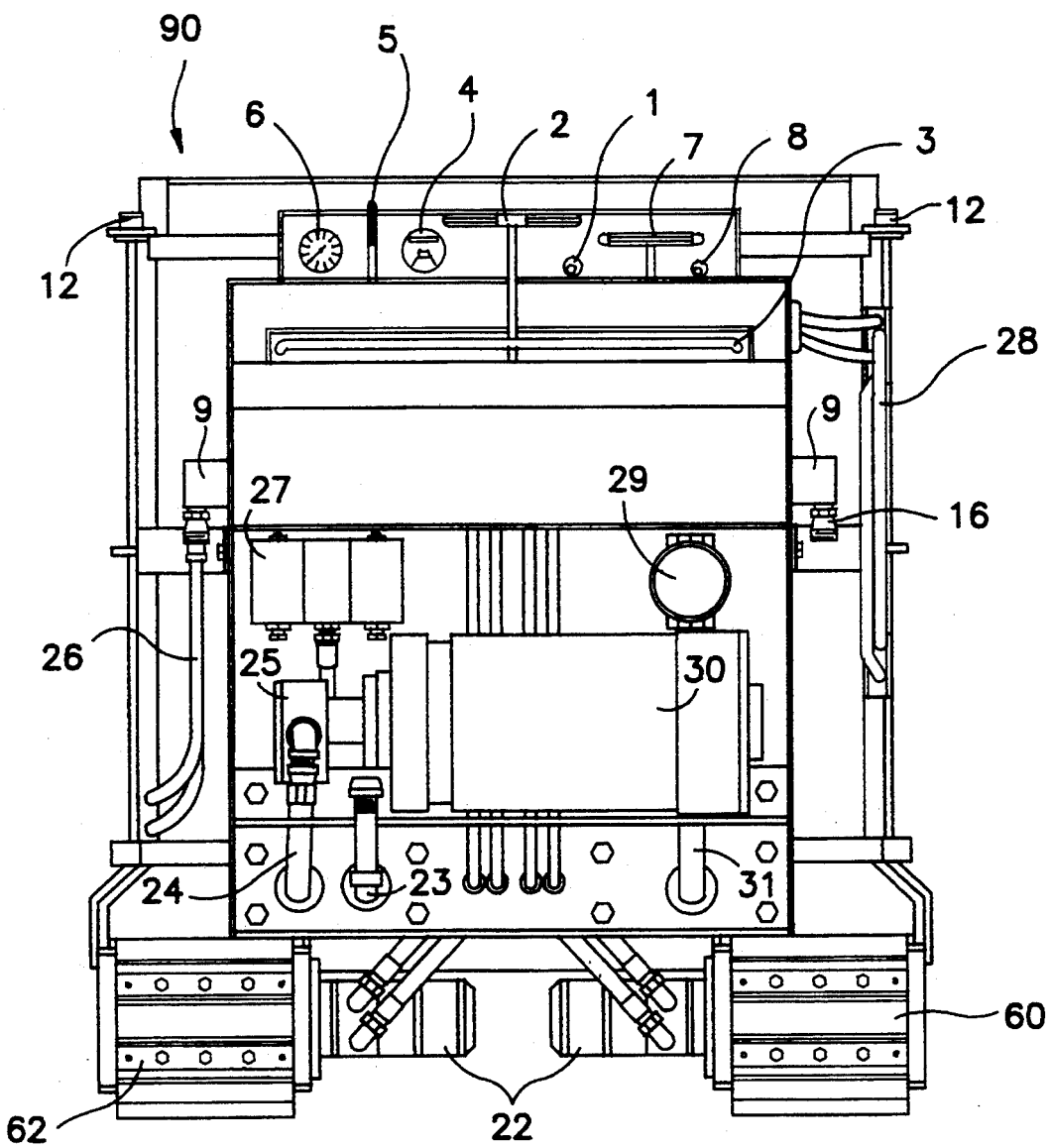
FIG. 6 is a rear view of the power machine of FIG. 1 complete with the hydraulically powered dumping bed and hopper attachment of FIG. 3 and illustrating the central hydraulic system and control mechanisms.

The central hydraulic system, shown in detail in FIG. 6, both drives the machine 90 and powers any of a variety of attachable, hydraulically powered implements. The central hydraulic system contains a sufficient amount of a hydraulic fluid which is circulated to and from a central tank through as series of internal lines and external hydraulic hoses. The rest of the central hydraulic system comprises a hydraulic pump 25, a hydraulic pump suction line 24, a hydraulic fill and breather pipe 23, a hydraulic return line 31, a hydraulic oil filter 29, and a hydraulic flow divider 27. The hydraulic pump 25, driven by an electric motor 30, is connected to the hydraulic pump suction line 24 which leads into the main body of the machine 90.

The hydraulic flow divider 27 provides two separate hydraulic flows for even motion of the machine 90 on the belt traction system and for smooth operation of the attachable, hydraulically powered implements. In other words, this flow divider 27 gives each of the two tracks of the belt traction system its own source of hydraulic power. Similarly, the flow divider 27 will provide two separate hydraulic flows to any attached, hydraulically powered implement that is linked to the central hydraulic system of the machine 90. The hydraulic flow divider 27 could be replaced with a dual stage pump to achieve similar results.

The central hydraulic system is hydraulically linked to two hydraulic power manifolds 9 mounted on the machine 90. Each of the hydraulic power manifolds 9 has four hydraulic quick connections 16, two male and two female. When any one of the attachable, hydraulically powered implements is joined to the machine 90, its hydraulic implement hoses 26 readily attach to the hydraulic quick connections 16 provided on the hydraulic power manifolds 9, thereby providing hydraulic power to the attached implement in a minimum amount of time. Having two male and two female hydraulic quick connections 16 on each of the hydraulic power manifolds 9 assists in proper directional hydraulic linking of any specific attachable implement.

Since the machine 90 is completely hydraulically powered, an outside source of hydraulic power could easily be used to run the entire machine 90 complete with any attached, hydraulically powered implement. For example, if another hydraulically run apparatus were in close vicinity to the machine 90, a hydraulic pump could be attached to the other hydraulically run apparatus. Two hydraulic hoses could then be run from the attached hydraulic pump of the apparatus to the machine 90, thereby providing all the hydraulic power necessary to run the machine 90. In the mining industry, there are a number of hydraulic power sources. Even though the machine 90 is self-contained, or better stated, electrically powered by a battery supply contained on the machine 90 itself, the power from such a battery supply could therefore be conserved when the machine 90 is relatively close to an external source of hydraulic power.

The electrical power supply is a series of batteries contained on and secured to the machine 90 itself. This series of batteries supplies power through battery power conductors 28 to the electrical motor 30 which in turn drives the hydraulic pump 25. These batteries are stored in two battery cases 13 which are secured to the machine 90 with two battery hold down bolts 12. Golf cart batteries are a relatively inexpensive and strong source of battery power. Since eight golf cart batteries will power the machine for approximately four hours, four of these golf cart batteries are contained within each of the two battery cases 13. The cases 13 may be quickly interchanged via two battery quick connect plugs 11 whenever the battery supply runs low.

Since the battery supply contained on the machine 90 drives the central hydraulic system, an outside source of electric power could instead be used to drive the central hydraulic system of the machine 90. For example, if an external electricity supply were in close vicinity to the machine 90, two conducting cables could join the machine to the external source and therefore provide all the electric power necessary to drive the central hydraulic system of the machine 90. In the same manner that using an external source of hydraulic power would conserve the energy stored within the battery supply contained on and secured to the machine 90 for times when such an external source would not be either reachable or feasible, using an outside source of electricity would do the same.

In order to safeguard against harmful surges in electric current, an electrical main breaker 10 is mounted to the side of the machine 90. This breaker 10 can interrupt the electrical flow from either the contained battery supply or from an external electric power source.

The operator of the machine 90 is either standing or walking behind the machine 90. Accordingly, all control and readout devices are placed on the rear, exterior of the machine 90. The off/on key switch 1, light switch 8, battery charge indicator 4, and main hydraulic pressure gauge 6 are all adjacent to one another on a panel on the rear of the machine 90. The off/on key switch 1 simply allows the operator to turn the machine 90 on or off. The light switch 8 may be used to turn on or off any external lights the machine 90 may have added to it. The battery charge indicator 4 allows the operator to judge how much operational time he or she has left with the indicated amount of electricity left in the battery supply. The main hydraulic pressure gauge 6 informs the operator of the pressure in the central hydraulic system, and thereby alerts him or her of any hydraulic leaks. The average pressure in the central hydraulic system of the present machine 90 will be roughly fifteen hundred pounds per square inch.

Immediately below the off/on key switch 1, light switch 8, battery charge indicator 4, and main hydraulic pressure gauge 6 are three control levers 2,5,7. The lever in the center is the tramming control lever 2 which controls the rotation of the tracks of the belt traction system, and therefore the motion of the entire machine 90. The lever on the left is the left hand control lever 5, and the lever on the right is the right hand control lever 7. These two levers 5,7 control whichever hydraulically powered implement has been joined to the machine 90. Each of the three levers 2,5,7 is linked to a valve which controls the hydraulic flow through one or more of the internal lines of the central hydraulic system. Thus, when the levers 2,5,7 are selectively moved, hydraulic flow through the valves is regulated, and the machine 90 as well as any attached implement each responds with a prescribed motion. For example, pulling on the tramming control lever 2 will make the machine go in reverse, while pushing on the tramming control lever 2 will make the machine 90 go forward. Turning the tramming control lever 2 counter-clockwise will make the machine 90 go to the left, while turning the tramming control lever 2 clockwise will make the machine 90 go to the right. If a boom and bucket assembly implement were attached to the machine 90, the left hand control lever 5 would control the bucket tilt and boom extend, while the right hand control lever 7 would control the boom swing and the boom lift. Therefore, motion of the machine 90 itself is controlled with only the tramming control lever 2, while motion of the hydraulically powered implements is controlled by both the left and right hand control levers 5,7.

As a safety measure, an emergency stop bar 3 has been included as a feature on the rear side of the machine 90. When a force is applied to the emergency stop bar 3, the contained battery supply is disconnected, and the hydraulic pressure in the central hydraulic system is relieved. Similarly, if an outside source of electric power is being used, applying a force on the emergency stop bar 3 will have the same effect of interrupting the external electricity flow. Lastly, if the machine 90 is being run by an auxiliary hydraulic power source, pushing the emergency stop bar 3 will actuate a valve mechanism to return the hydraulic flow to the auxiliary source. The emergency stop bar 3 could be replaced with an emergency stop switch.

Figure 2:
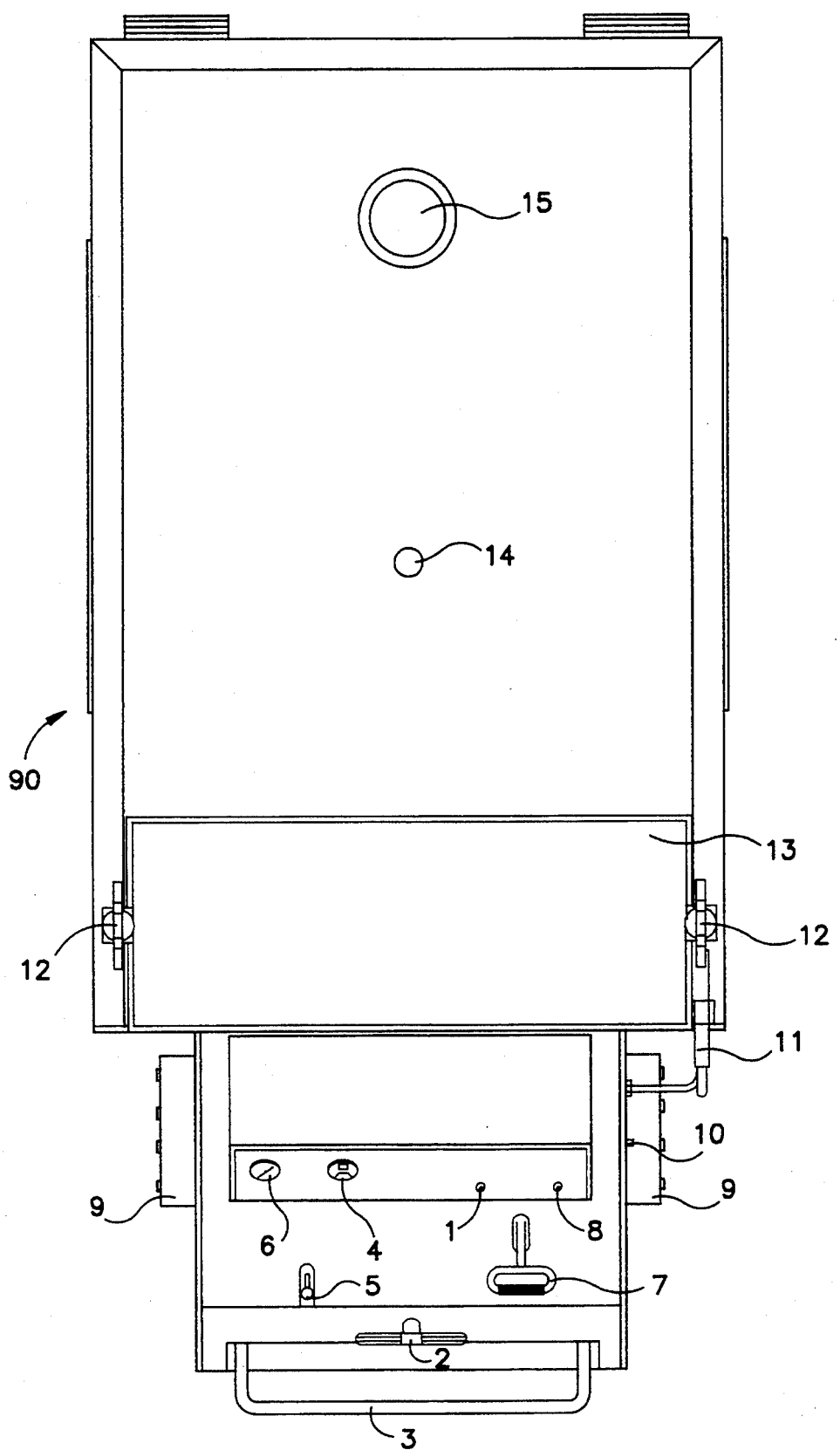
FIG. 2 is a top view of the power machine of FIG. 1.
Figure 3:
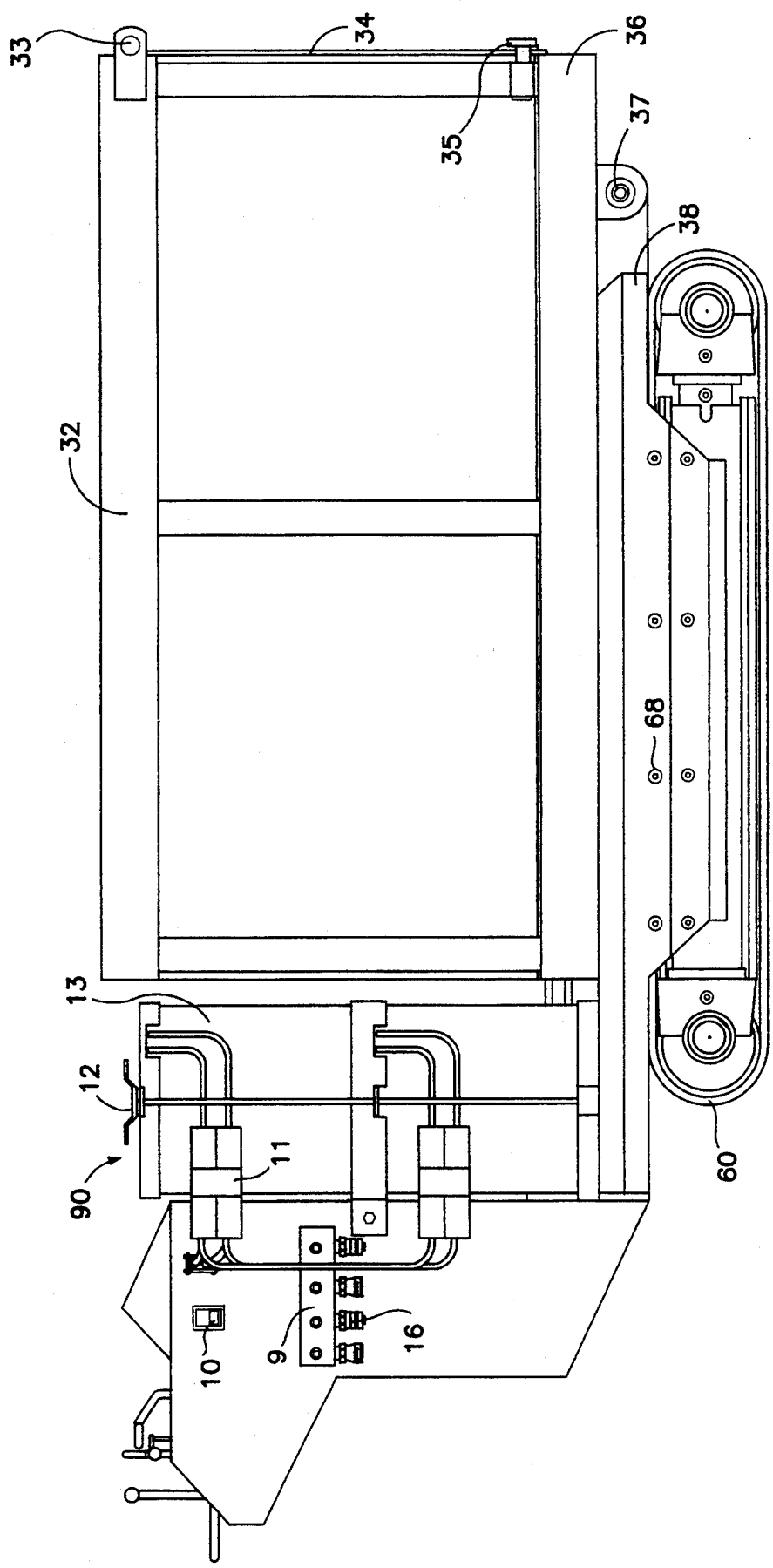
FIG. 3 is a left side view of the power machine of FIG. 1 complete with a hydraulically powered dumping bed and hopper attachment.
Figure 4:
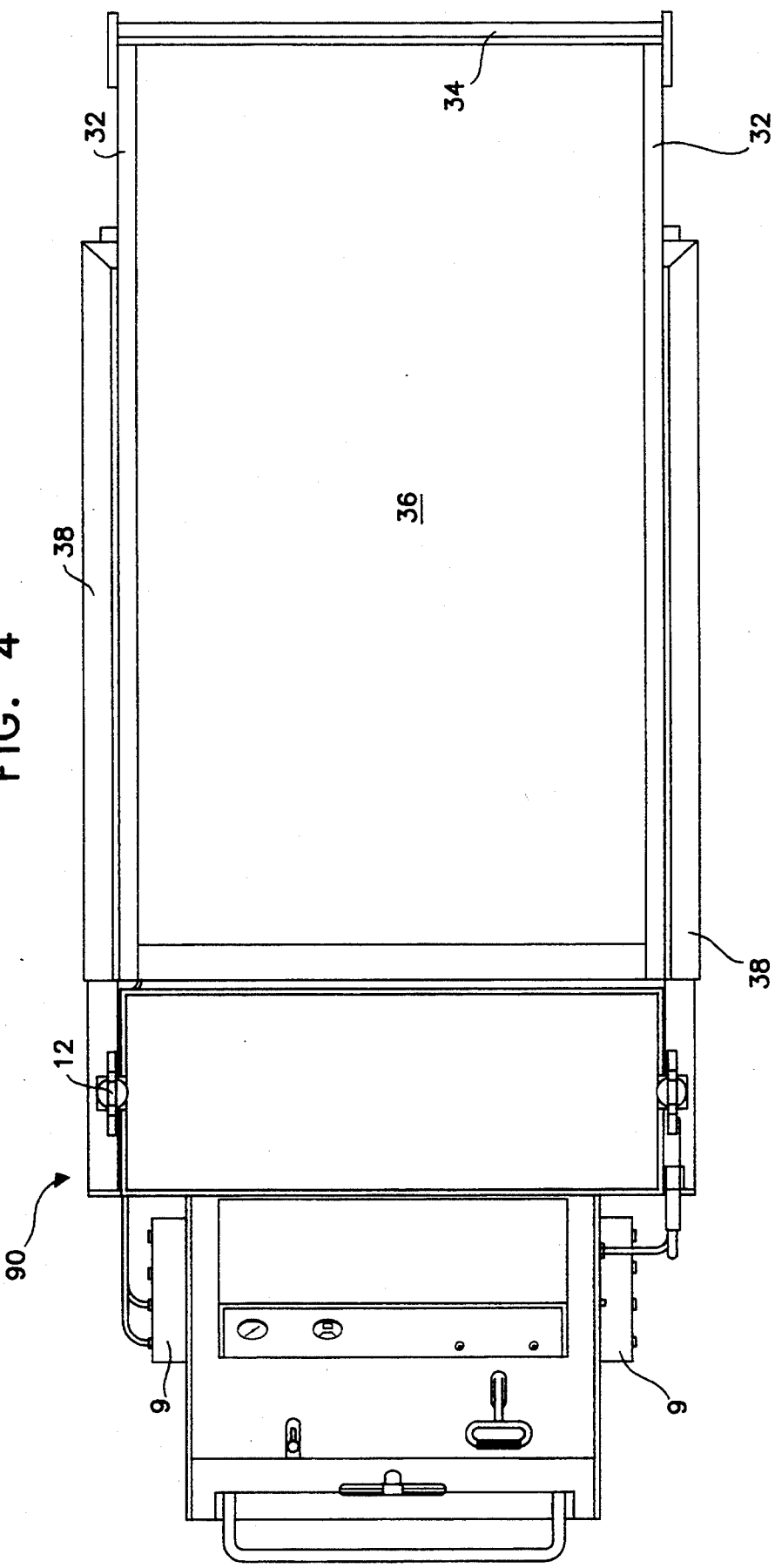
FIG. 4 is a top view of the power machine complete with the hydraulically powered dumping bed and hopper attachment of FIG. 3.

FIG. 2 illustrates the means to receive any of a variety of hydraulically powered material handling implements. Through the main platform of the machine 90 are a larger hole serving as an assembly socket 15 and a smaller hole serving as a torque arm socket 14. Each of the hydraulically powered material handling implements that are to be used in conjunction with the machine 90 has two shafts running parallel to one another and extending from a plate on the bottom of its structure. The two shafts are sized accordingly and spaced appropriately to mate with the assembly socket 15 and torque arm socket 14 on the platform of the machine 90. Thus, when any of the hydraulically powered implements are attached to the machine 90, the two shafts extending from the bottom plate of the implement slide through the assembly socket 15 and torque arm socket 14, and the bottom plate of the implement rests on the platform of the machine 90. In order to tightly fasten the implement to the machine 90, a retainer cap 55 is secured to the bottom of the larger shaft from underneath the platform of the machine 90. This makes the connection between the implement and the machine 90 so rigid that any force exerted on the implement is transferred to the frame of the machine 90. The fit of the smaller shaft through the torque arm socket 14 alone prevents any significant rotation of the attached implement about the assembly socket 15. Thus, the assembly socket 15 and the torque arm socket 14 work in a complementary relationship to secure any of the hydraulically powered, material handling implements to the machine 90.

Figure 7:
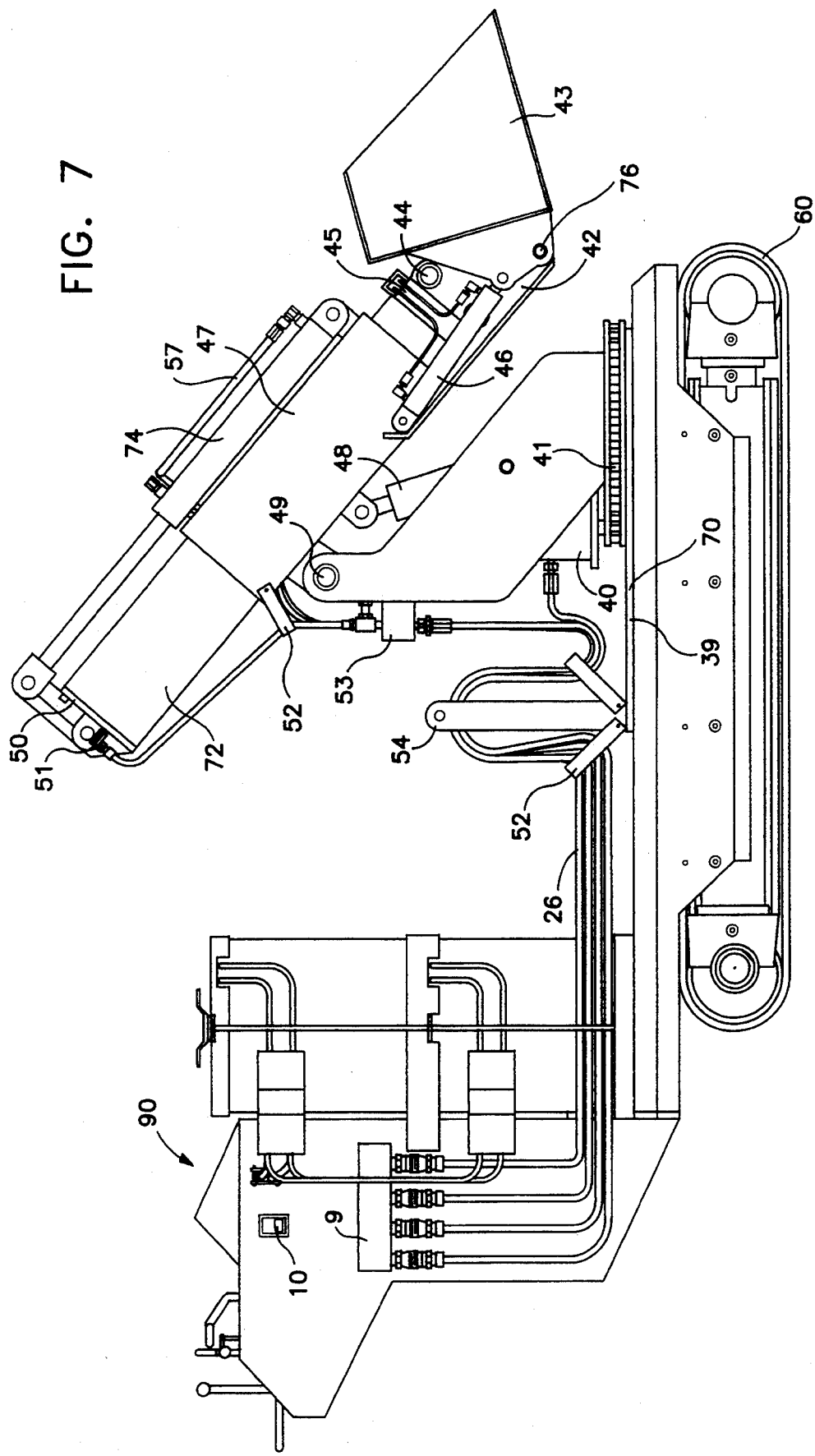
FIG. 7 is a left side view of the power machine of FIG. 1 complete with a hydraulically powered, telescoping boom and bucket assembly.
Figure 8:
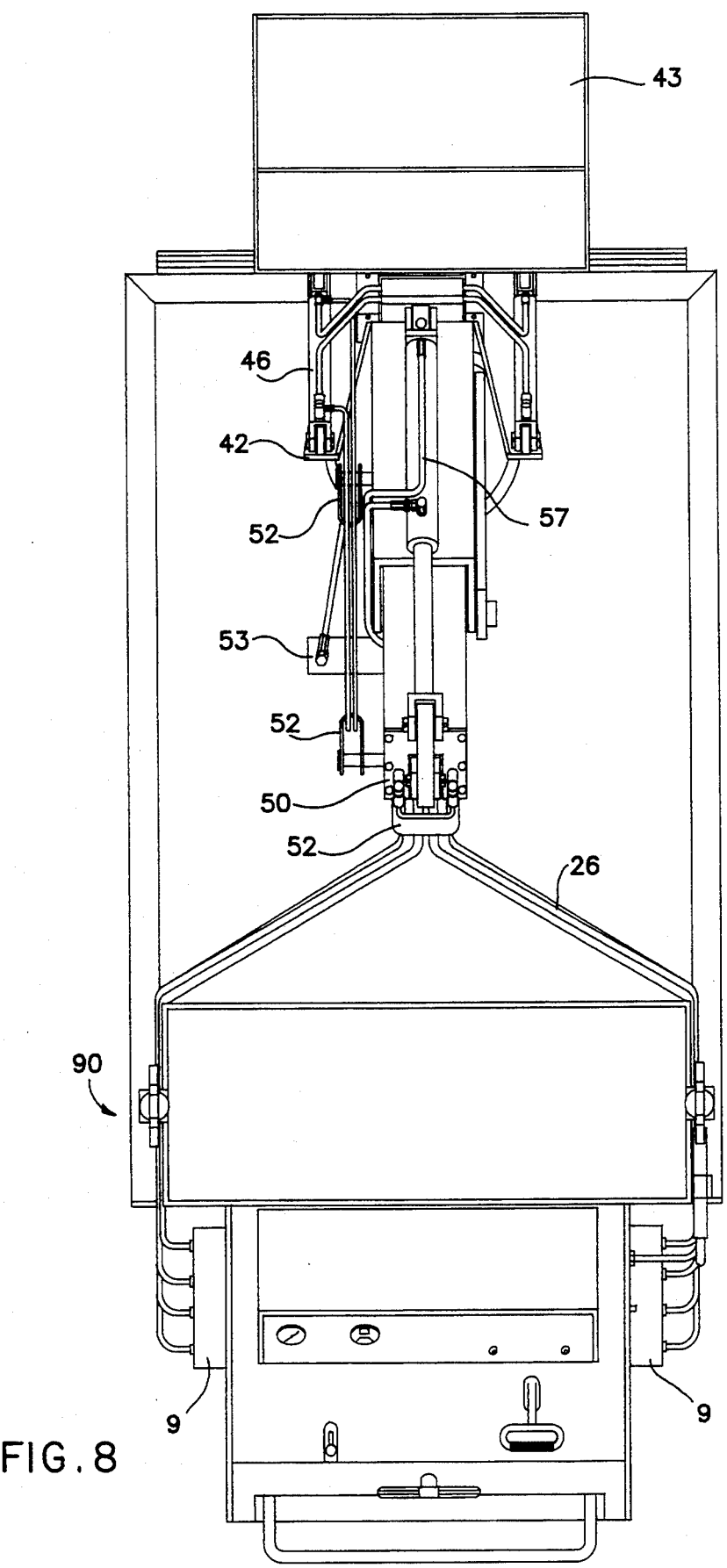
FIG. 8 is a top view of the power machine and hydraulically powered, telescoping boom and bucket assembly of FIG. 7.
Figure 9:
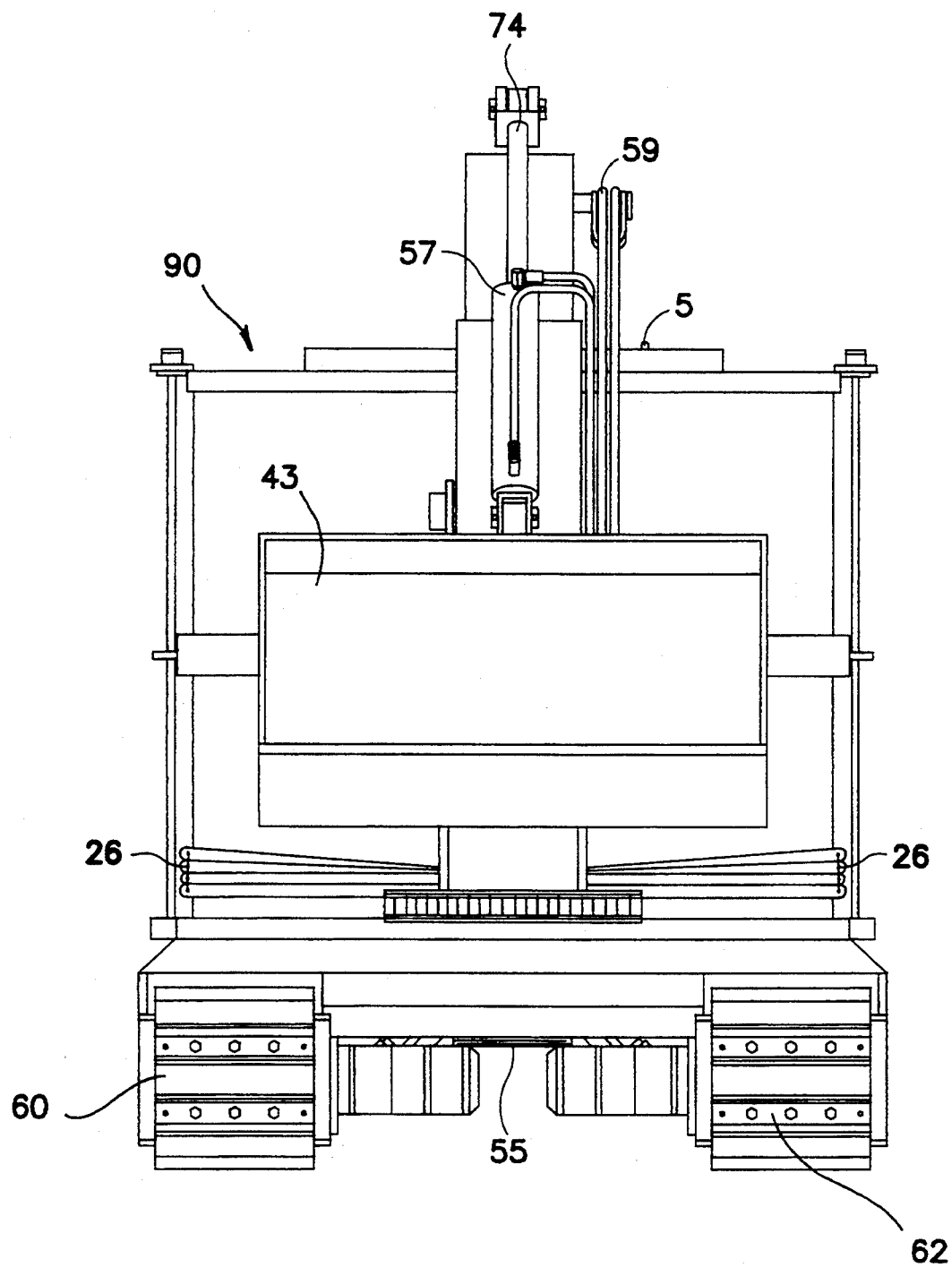
FIG. 9 is a front view of the power machine and hydraulically powered, telescoping boom and bucket assembly of FIG. 7.

FIG. 7 shows the connection of a unique, hydraulically powered, telescoping boom and bucket assembly to the machine 90. The hydraulic hoses 26 have been linked to the central hydraulic system of the machine 90 through the hydraulic power manifold 9. The bottom plate 70 of the telescoping boom and bucket assembly rests on the platform of the machine 90. The rigid connection of the retainer cap 55 to the larger shaft extending through the assembly socket 15 may be seen in the front view of FIG. 9. The relative position of the smaller shaft through the torque arm socket 14 is given by reference numeral 39.

The inside stage of the main extension boom 45 is attached to an adapter plate 42 with two connecting pins 44. The adapter plate 42 is then joined to the bucket 43 by another pin through the bucket tilt axis 76. It is about this bucket tilt axis 76 that the bucket pivots. Connected to the adapter plate 42 and the bucket 43 are two bucket tilt hydraulic cylinders 46. These cylinders 46, being joined to the central hydraulic system of the machine 90 through bucket tilt hydraulic hoses 59, force the bucket 43 to pivot about the bucket tilt axis 76. The bucket 43 is approximately twenty four inches wide.

The telescoping boom and bucket assembly has four separate, hydraulically controlled movements: rotation, extension or retraction, lift, and bucket tilt. Bucket tilt has already been explained. Rotation of the telescoping boom and bucket assembly is about a vertical axis. It is achieved by the boom swing hydraulic motor 40. This hydraulic motor 40 is connected by a roller chain 41 to the body of the telescoping boom and bucket assembly. When the hydraulic motor 40 is hydraulically actuated, it places tension on the roller chain 41 and thus rotates the telescoping boom and bucket assembly about a vertical axis.

Extension and retraction of the telescoping boom and bucket assembly is the most unique feature. In keeping with the compact nature of the machine 90, the telescoping boom and bucket assembly has the feature that it can rotate about a vertical axis in a very narrow area. When extending the bucket 43 in operational use, the main boom extension hydraulic cylinder 72, with an internal cylinder, first extends the bucket 43 approximately twenty four inches, end the supplementary boom extension hydraulic cylinder 74 then extends the bucket 43 another twelve inches. In retraction of the bucket 43, the supplementary boom extension hydraulic cylinder 74 first retracts the bucket 43 twelve inches, and the main boom extension hydraulic cylinder 72 then retracts the bucket 43 another twenty four inches.

The telescoping boom and bucket assembly is shown in its most retracted position in FIG. 7. When the bucket 43 is first extended, the main boom extension hydraulic cylinder 72 pushes the inside stage of the main extension boom 45 roughly twenty four inches downward. This is due to the action of pressurized hydraulic fluid flowing through the hydraulic fitting 51 and to the inner piston of the main extension hydraulic cylinder 72. The bucket 43, connected to the inside stage of the main extension boom 45, also moves twenty four inches downward. During this part of the extension process, the extension boom end plate 50 and adjacent parts remain stationary. The main boom extension hydraulic cylinder 72 does not yet slide through the boom elevation bracket 47. At the end of this extension, the supplementary boom extension hydraulic cylinder 74 begins its twelve inch extension process as pressurized hydraulic fluid flows through its boom extend hydraulic hoses 57. During this secondary extension process, the boom end plate 50 and adjacent parts move twelve inches downward. The main boom extension hydraulic cylinder 72, connected to the boom end plate 50, slides twelve inches downward through the boom elevation bracket 47. Still pressurized from the first extension stage of the main boom extension hydraulic cylinder 72, the inside stage of the main extension boom 45 and adjoining bucket 43 are also extended twelve more inches downward. Note that the boom end plate 50 only extends twelve inches downward, while the bucket 43 extends thirty six total inches downward.

Retraction of the hydraulic cylinders 72, 74 of the telescoping boom and bucket assembly is just the opposite of extension. From a most extended position wherein the bucket 43 has been extended approximately thirty six total inches from its most retracted position, the supplementary boom extension hydraulic cylinder 74 begins a twelve inch retraction. During this initial retraction, the main boom extension hydraulic cylinder 72, connected to the boom end plate 50, slides twelve inches upward through the boom elevation bracket 47. At the end of this initial retraction, the main boom extension hydraulic cylinder 72 begins a twenty four inch retraction of the inside stage of the main extension boom 45 and the adjoining bucket 43. Note that the boom end plate 50 only retracts twelve inches upward, while the bucket 43 retracts thirty six total inches upward.

The reason the hydraulic cylinders 72,74 of the telescoping boom and bucket assembly extend and retract in series, or one after another, is a parallel hydraulic connection from the central hydraulic system to the two cylinders 72,74. In other words, the main boom extension hydraulic cylinder 72 and the supplementary boom extension hydraulic cylinder 74 are equally pressurized from the hydraulic fluid of the central hydraulic system during any given extension or retraction process. The reason the main boom extension hydraulic cylinder 72 extends first is that, during extension, the area of the side of its inner piston that is exposed to the pressurized fluid is greater than the area of the side of the piston of the supplementary boom extension hydraulic cylinder 74 that is exposed to the same fluid. Since the hydraulic pressure on both pistons is the same, the force on the piston with the larger surface area will be greater than the force on the piston with the smaller surface area. Thus, the main boom extension hydraulic cylinder 72 extends first and completely before the supplementary boom extension hydraulic cylinder 74 can begin its extension.

The opposite order but same reasoning holds for the retraction process, where the supplementary boom extension hydraulic cylinder 74 retracts first and completely before the main boom extension hydraulic cylinder 72. The reason for this order is that, during retraction, the area of side of the inner piston of the supplementary boom extension hydraulic cylinder 74 that is exposed to the pressurized fluid is greater than the area of the side of the piston of the main boom extension hydraulic cylinder 72 that is exposed to the same fluid.

Having the hydraulic extend cylinders 72,74 extend and retract in this manner has a few distinct advantages. First, since the boom end plate 50 only retracts twelve total inches, the back end of the telescoping boom and bucket assembly will be less likely to collide with a wall or obstruction when the assembly is rotated. Thus, the machine 90 is very functional in a narrow passageway or in any confined area. Second, since the machine 90 is smaller in scale than other similar devices, the machine 90 may have difficulty in rotating a full bucket 43 when the bucket is fully extended. In other words, since the machine 90 is relatively light in weight, the large moment arm created by such a full, extended bucket 43 is likely to cause a degree of instability in the machine 90 when rotation is attempted. In order to allow the machine 90 to rotate heavier loads with less difficulty and instability, the full and extended bucket 43 may be retracted before it is rotated. By first retracting the full bucket 43, the moment arm therein created is minimized. The load may then be rotated, extended, and dumped with a minimum of difficulty.

The hydraulic lifting motion of the telescoping boom and bucket assembly is achieved by the hydraulic boom elevation cylinder 48 joined to the boom elevation bracket 47. When the hydraulic boom elevation cylinder 48 is actuated, the entire telescoping boom and bucket assembly pivot about the main boom hinge pin 49. The hydraulic boom elevation cylinder 48, like all hydraulic cylinders, is linked to the central hydraulic system of the machine 90.

Since the telescoping boom and bucket assembly implement requires the use of a plurality of hydraulic hoses 26,57,59, there is a need to keep the hoses 26,57,59 out of the way of the moving parts of the machine 90. A hydraulic manifold block 53 has been included to help maintain a better controlled arrangement of the lower hydraulic hoses 26. A novel feature which helps take-up the slack of the lower hydraulic hoses 26 during operation is a slack take-up mechanism 54 mounted to the bottom plate 70 of the implement. The slack take-up mechanism 54 has three elastic straps 52 through which the hydraulic hoses 26 loop through. When the hoses 26 are pulled away, the elastic straps 52 become stretched and tensioned. When looseness occurs in any one of the hoses 26, the elastic straps 52 pull the hoses 26 in and eliminate excessive slack. These elastic straps 52 are also used along the telescoping boom of the implement to contain both the hydraulic hoses 57 leading to the extend cylinders 72,74 and the hydraulic hoses 59 leading to the bucket tilt cylinders 46.

Figure 10:
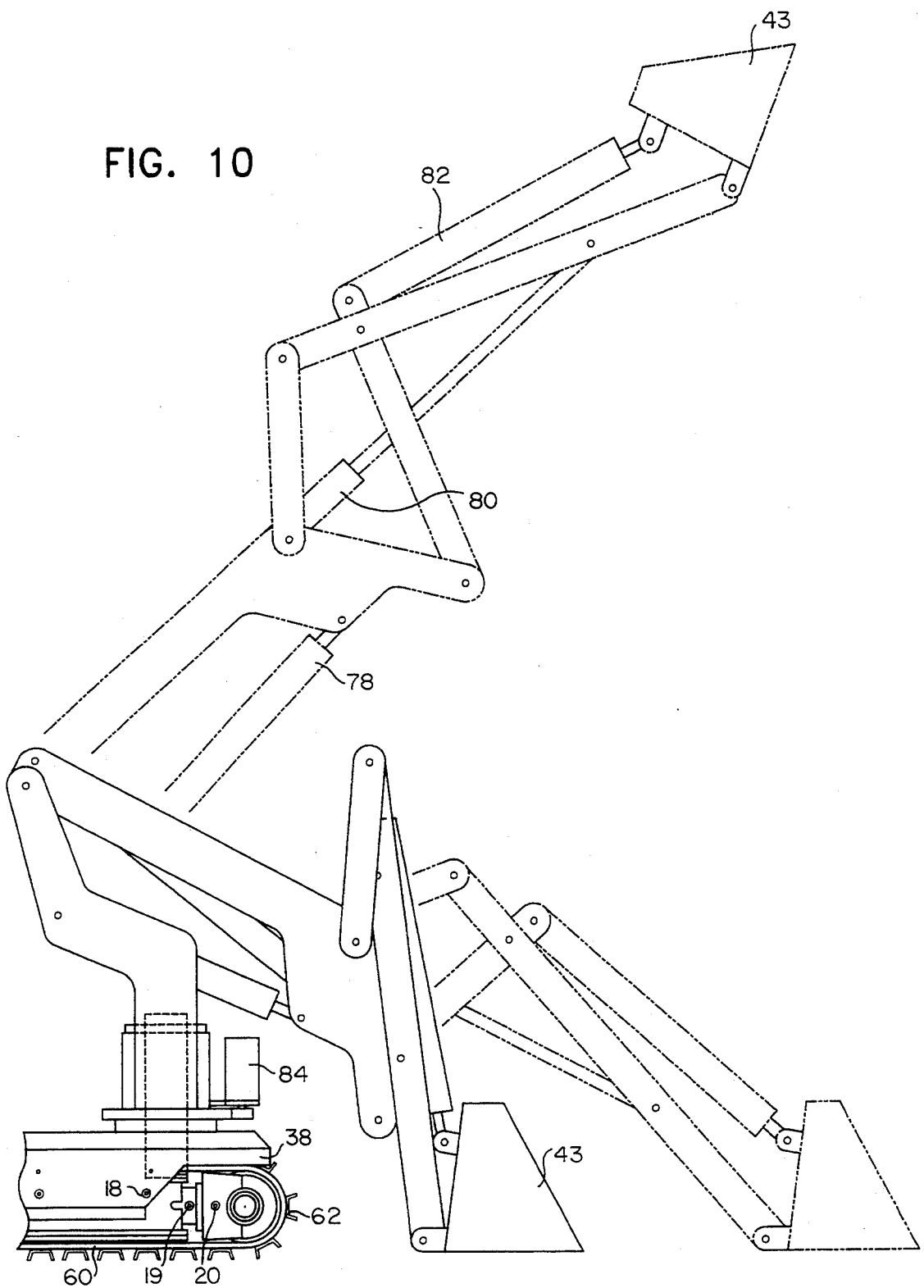
FIG. 10 is a left side view of the front end of the machine of FIG. 1 complete with a hydraulically powered bucket assembly having improved forward reach and higher lift capacity.

An alternative bucket assembly implement having an improved forward reach and higher lift capacity is depicted in FIG. 10. This implement is coupled to the platform of the machine 90 in the same manner that the telescoping boom and bucket assembly was joined. The implement is also rotated about a vertical axis by means of a hydraulic motor 84. The implement has hydraulic lift cylinder 78, a hydraulic extend cylinder 80, and a hydraulic bucket tilt cylinder 82, each individually linked to the central hydraulic system of the machine 90. The unique kinematic configuration of the implement allows its bucket 43 to extend forty two inches forward when it is at ground level. This is advantageous during material loading since moving only the bucket 43 forward conserves power by not having to move the entire machine 90. The kinematic configuration of the implement also allows the bucket 43 to be raised extremely high in the air, thereby allowing it to dump the contents in its bucket 43 at an increased elevation.

The manner in which the telescoping boom and bucket assembly and the improved forward reach and higher lift capacity bucket assembly were attached to the machine is not specific to just these two implements. In fact, a wide range of implements may be manufactured to have two shafts sized and spaced to fit in the assembly socket 15 and the torque arm socket 14 of the machine 90. Therefore, a number of other implements such as a hydraulically powered drill, a hydraulically powered ring cutter, or even a hydraulically powered winch could be used in conjunction with the machine 90 to diversify its applications.

Figure 11:
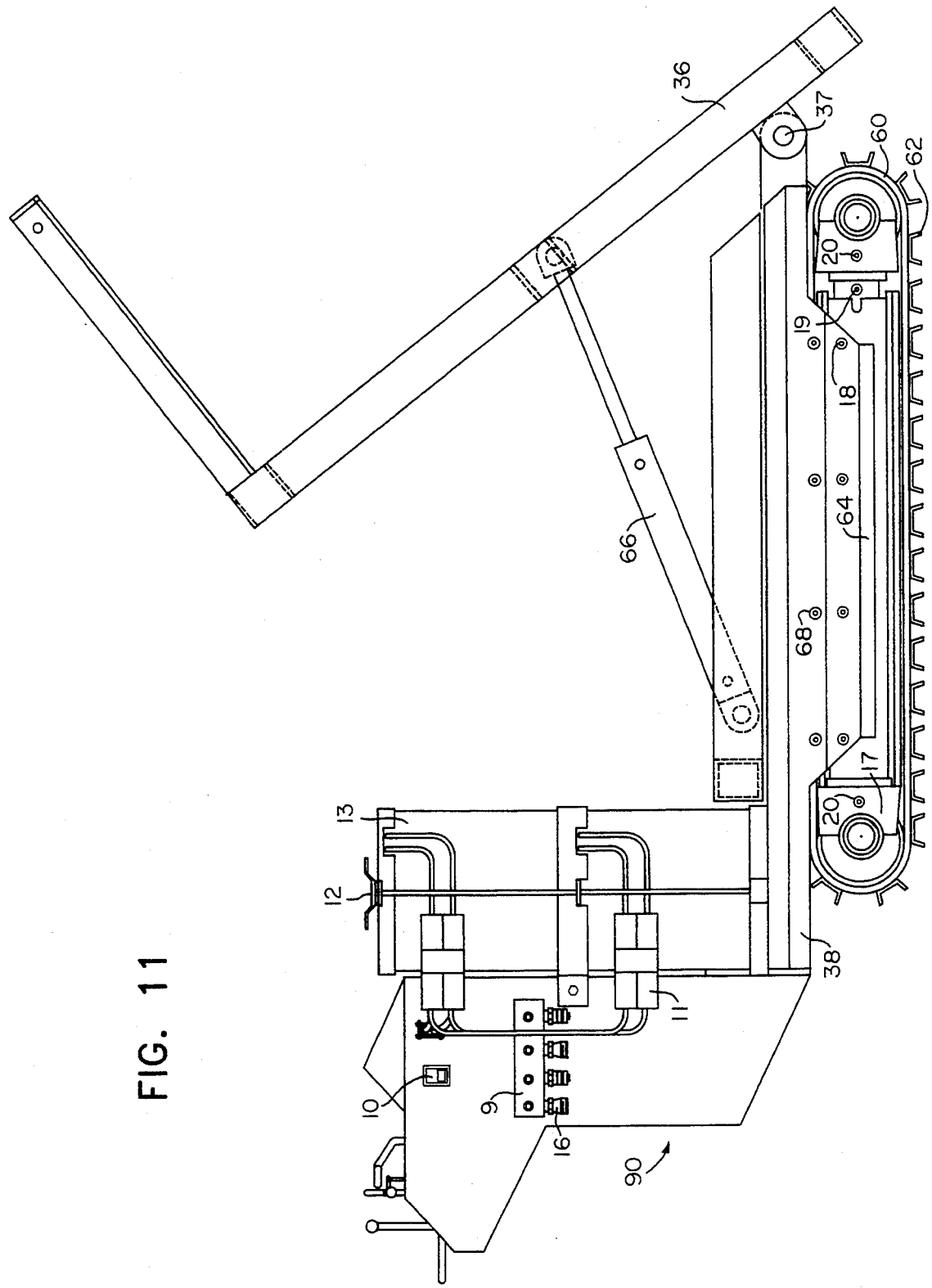
FIG. 11 is a left side view of the machine of FIG. 1 complete with a hydraulically powered dumping bed assembly, the dumping bed having been pivoted about its hinge axis by a hydraulic cylinder.

Yet another hydraulically powered implement which is attached to the machine 90 is a hydraulically powered dumping bed assembly as shown on FIG. 11. However, this implement is not attached to the platform of the machine 90 with two shafts. Instead, an adapter body 38 is bolted to the frame of the machine 90 with mounting bolts 68. The reason for the difference in mounting this implement is that, since the dumping bed will be hauling immense amounts of weight, the machine 90 would better function if the weight were spread out more evenly over the entire machine 90 rather than locally near the assembly socket 15 and torque arm socket 14.

The adapter body 38 is joined to the dump bed attachment 36 at the hinge point 37 for the dump bed. The dump bed attachment 36 pivots about this hinge point 37 when acted upon by a hydraulic dump bed lift cylinder 66. This hydraulic lift cylinder 66, linked to the central hydraulic system of the machine 90, is attached to the adapter body 38 and to the dump bed attachment 36. This hydraulically powered dumping bed assembly could be used to haul and dump a load of cement blocks into a confined area.

By attaching side boards 32 and a tail gate 34 to the hydraulically powered dumping bed assembly, a hydraulically powered hopper assembly results. This hopper assembly, illustrated in FIGS. 3 and 4, can be used to haul and dump loose materials such as coal and dirt. The tail gate 34 pivots about a hinge point 33 and closes with a latch mechanism 35.

In view of the above teachings, it should be clear that the invention is not limited to the details illustrated in the accompanying drawings, but may be subject to modifications falling within the spirit and scope of the invention. Therefore, without restricting the invention to the specific construction previously described, the invention shall cover all modifications falling within the scope of the appended claims.

What is claimed is:

1. A miniature, portable, self-contained power machine for handling materials, comprising:
   a rigid frame having an integral platform and providing a base structure for all components of said machine:
   electrical power supply means for powering said machine and attached to said rigid frame;
   means for regulating the motion of said machine;
   two endless belts forming a traction system for moving said machine over various terrains and attached to said rigid frame;
   a central hydraulic system which is powered by said electrical power means;
   a hydraulically powered telescoping boom and bucket assembly having a telescopic boom and a plate connected to said telescoping boom having two differently sized shafts extending from said plate;
   an assembly socket formed in said integral platform of said rigid frame for receiving and rigidly securing the larger of said two differently sized shafts extending from said plate;
   a torque arm socket means formed in said integral platform of said rigid frame for receiving and rigidly securing a smaller of said two differently sized shafts extending from said plate; and
   a retainer cap for fastening to said larger of said two differently sized shafts from underneath said integral platform and for rigidly securing said larger of said two differently sized shafts within said assembly socket and thereby securing said telescoping boom and bucket assembly to said machine.

2. A miniature, portable, self-contained power machine for handling materials, comprising:
   a rigid frame having an integral platform and providing a base structure for all components of said machine;
   electrical power supply means for powering said machine and attached to said rigid frame;
   means for regulating the motion of said machine;
   two endless belts forming a traction system for moving said machine over various types of terrain and attached to said rigid frame;
   a central hydraulic system which is powered by said electrical power means;
   a hydraulically powered, telescoping boom and bucket assembly, including:
   (a) a telescoping boom;
   (b) a boom elevation and retainer sleeve to hold said telescoping boom;
   (c) a plate connected to said telescoping boom and bucket assembly having two different-sized shafts extending therefrom;
   (d) a bucket assembly connected at an end of said boom;
   (e) hydraulic means to rotate said telescoping boom and bucket assembly about a vertical axis;
   (f) hydraulic means to extend and retract said telescoping boom and bucket assembly;
   (g) hydraulic means to elevate said telescoping boom and bucket assembly;

(h) hydraulic means to pivot said bucket assembly;
(i) a multiplicity of hydraulic hoses for transferring power from said central hydraulic system to said various hydraulic means of said telescoping boom and bucket assembly;
(j) means to take up the slack of said hydraulic hoses assuring operation of said telescoping boom and bucket assembly;

an assembly socket formed in said integral platform of said rigid frame for receiving and rigidly securing a larger of said two differently sized shafts extending from said plate; and a retainer cap for fastening to a larger of said two differently sized shafts extending from said adapter plate from underneath said integral platform thereby rigidly securing said larger of said two differently sized shafts within said assembly socket and said telescoping boom and bucket assembly to said machine.

3. A miniature, portable, self-contained power machine for handling materials as recited in claim 2, wherein said hydraulic means to elevate said telescoping boom and bucket assembly is a boom elevation hydraulic cylinder which is attached to said boom elevation and retainer sleeve and connected to said central hydraulic system.

4. A miniature, portable, self-contained power machine for handling materials as recited in claim 2, wherein said hydraulic means to rotate said telescoping boom and bucket assembly about a vertical axis is a hydraulic motor connected to said central hydraulic system.

5. A miniature, portable, self-contained power machine for handling materials as recited in claim 2 wherein said boom elevation and retainer sleeve holds said telescoping boom whereby said telescoping boom can freely extend and retract therethrough.

6. A miniature, portable, self-contained power machine for handling materials as recited in claim 2, wherein said telescoping boom comprises a plurality of hydraulic cylinders which are slidingly connected in a series relative to each other and can extend and retract one at a time.

* * * * *